(12) United States Patent
Chio

(10) Patent No.: US 7,755,239 B2
(45) Date of Patent: Jul. 13, 2010

(54) MAGNETIC REPULSION TYPE BEARING

(76) Inventor: Chuy-Nan Chio, 4F-2, No.333, Fu-Hsing N. Rd., Taipei (TW)

( * ) Notice: Subject to any disclaimer, the term of this patent is extended or adjusted under 35 U.S.C. 154(b) by 282 days.

(21) Appl. No.: 12/091,212

(22) PCT Filed: Oct. 24, 2005

(86) PCT No.: PCT/CN2005/001760

§ 371 (c)(1),
(2), (4) Date: Apr. 23, 2008

(87) PCT Pub. No.: WO2007/048273

PCT Pub. Date: May 3, 2007

(65) Prior Publication Data

US 2008/0231130 A1    Sep. 25, 2008

(51) Int. Cl.
*F16C 32/04* (2006.01)
*F04D 29/048* (2006.01)
*F04D 29/058* (2006.01)

(52) U.S. Cl. .................. 310/90.5; 505/705; 505/211

(58) Field of Classification Search ............ 310/90.5; 505/705, 211, 876

See application file for complete search history.

(56) References Cited

U.S. PATENT DOCUMENTS

| | | | | |
|---|---|---|---|---|
| 4,072,370 A | * | 2/1978 | Wasson | 310/90.5 |
| 4,379,598 A | * | 4/1983 | Goldowsky | 310/90.5 |
| 4,904,971 A | * | 2/1990 | Jin | 505/211 |
| 6,570,286 B1 | * | 5/2003 | Gabrys | 310/90.5 |
| 7,119,465 B2 | * | 10/2006 | Chio | 310/90.5 |
| 2008/0231130 A1 | * | 9/2008 | Chio | 310/90.5 |

FOREIGN PATENT DOCUMENTS

| | | | |
|---|---|---|---|
| JP | 2004323208 A | * | 11/2004 |
| WO | WO 2006122448 A1 | * | 11/2006 |
| WO | WO 2007048273 A1 | * | 5/2007 |

* cited by examiner

*Primary Examiner*—Quyen Leung
*Assistant Examiner*—David W. Scheuermann
(74) *Attorney, Agent, or Firm*—Chun-Ming Shih

(57) ABSTRACT

A magnetic repulsion type bearing includes a plurality of induction iron pieces, a stator, a rotor, an outer casing, an inner casing and a current controlling device. The rotor is disposed inside the stator, and the iron pieces of the rotor and the iron pieces of the stator are arranged in an alternate manner so that the rotor may be fixedly held in the stator through the magnetic repulsion between them. Also, the outer casing and the inner casing enclose the rotor and the stator so as to shield the electromagnetic force. In addition, the current controlling device may be used to control the amount of current and the direction of the current flow so as to control the strength of the electromagnetic force and the polarity.

6 Claims, 6 Drawing Sheets

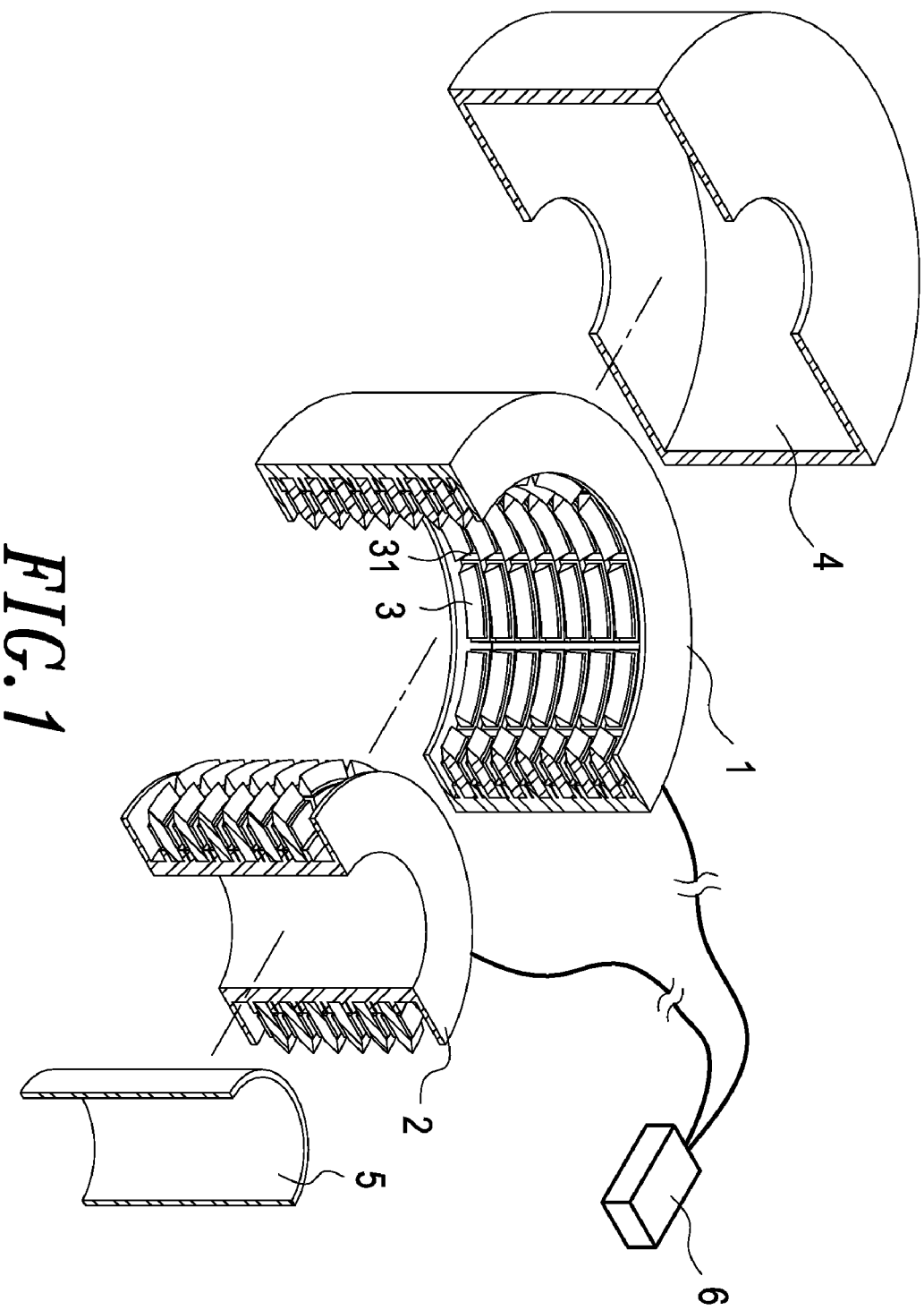

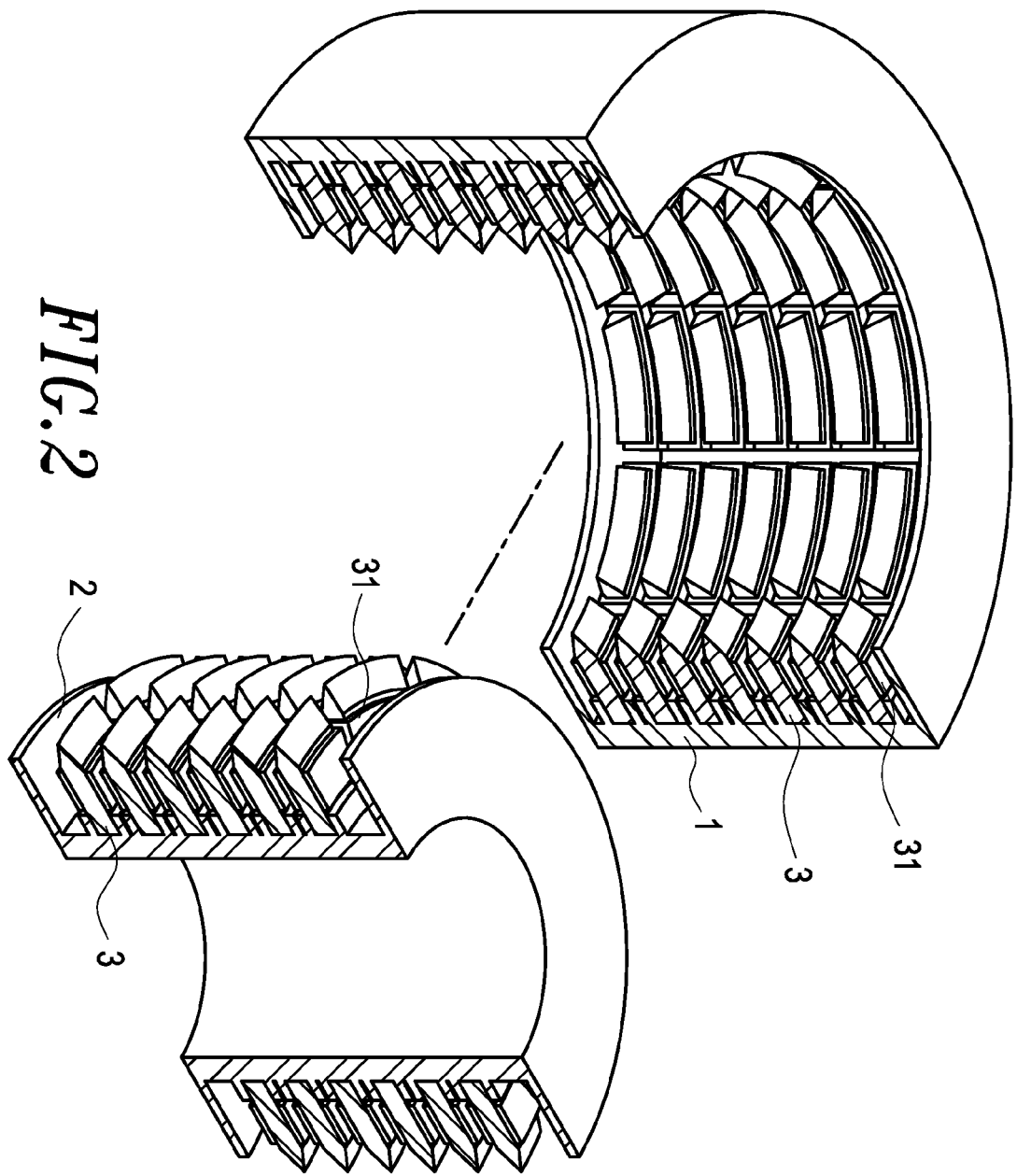

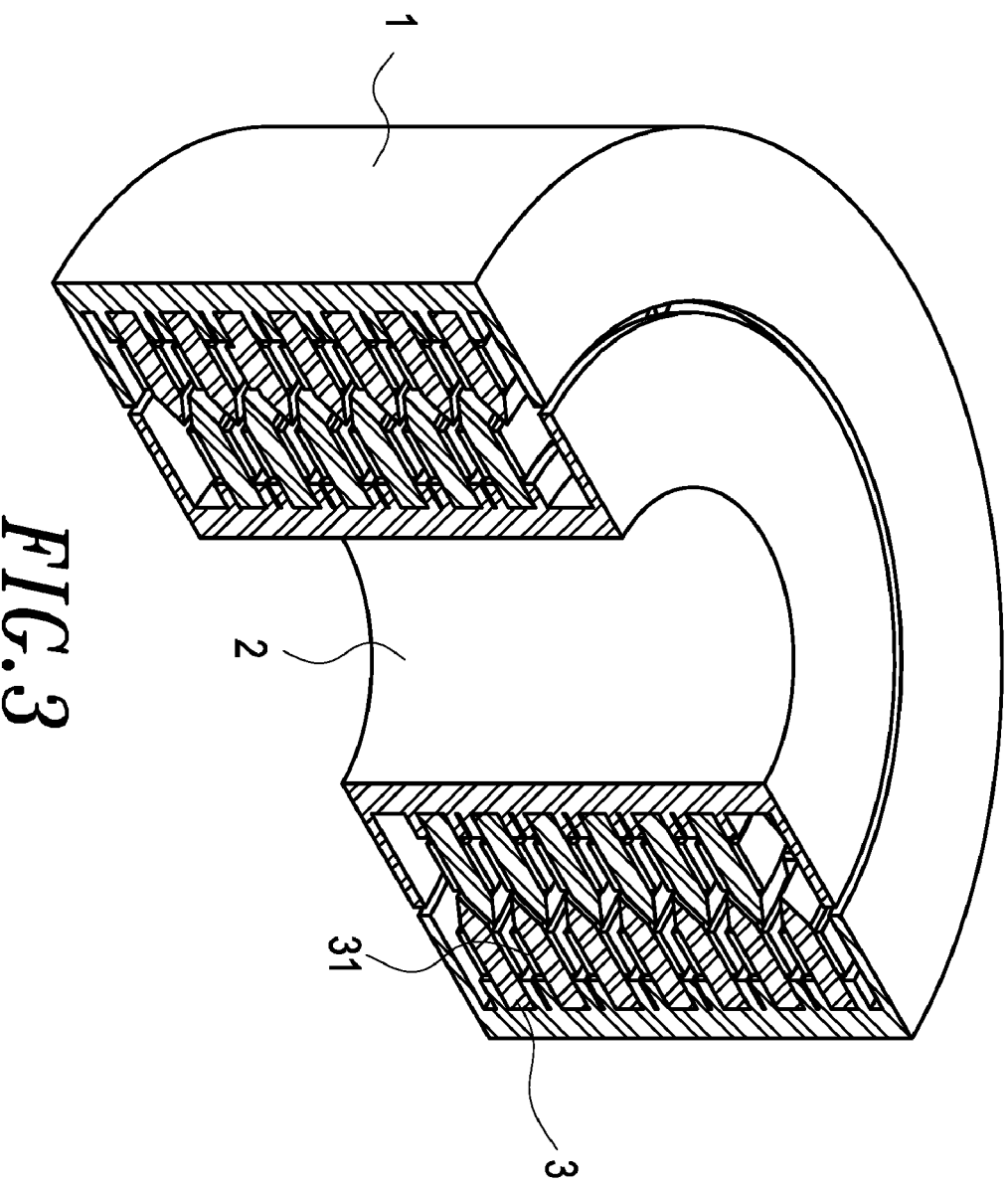

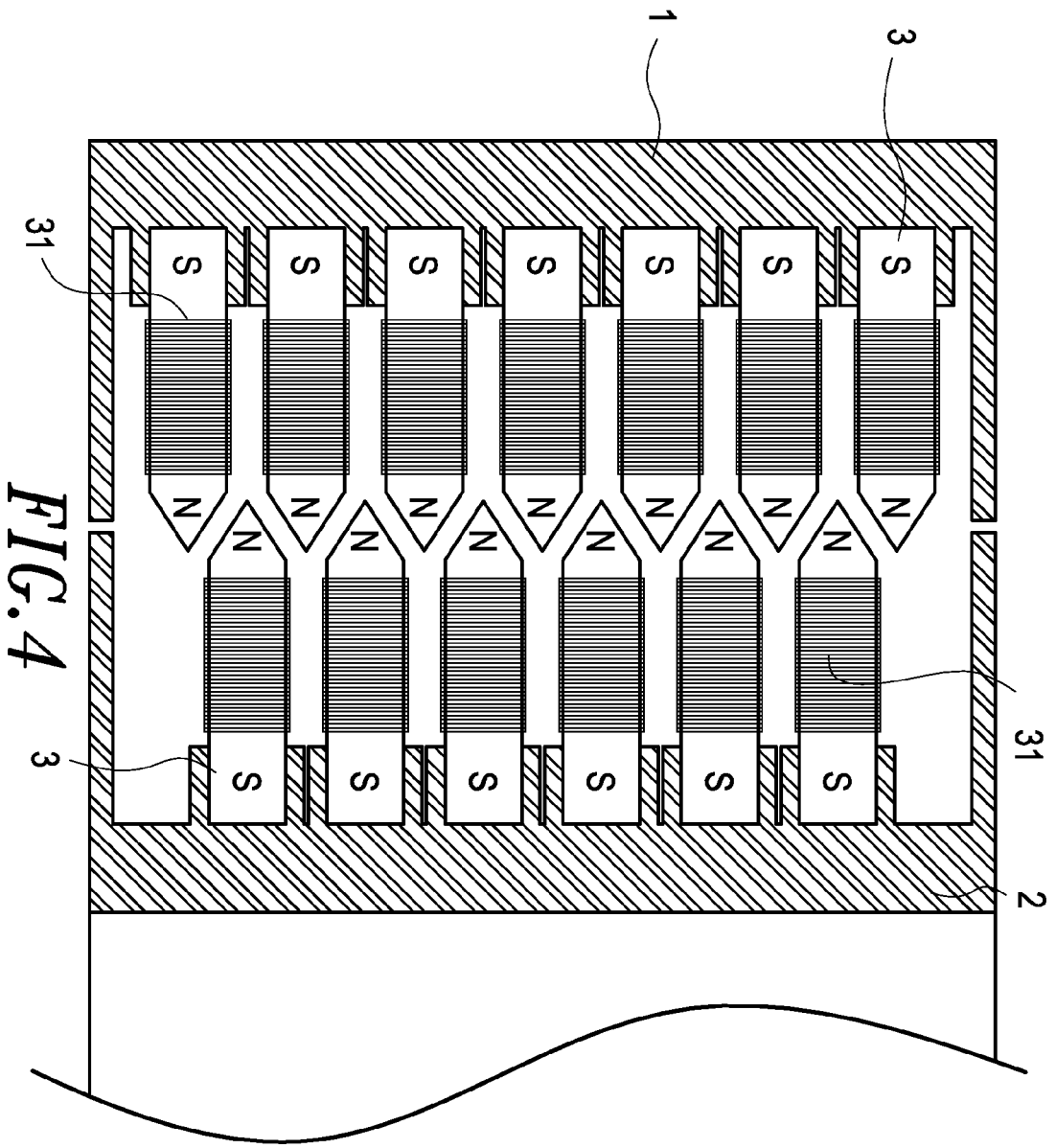

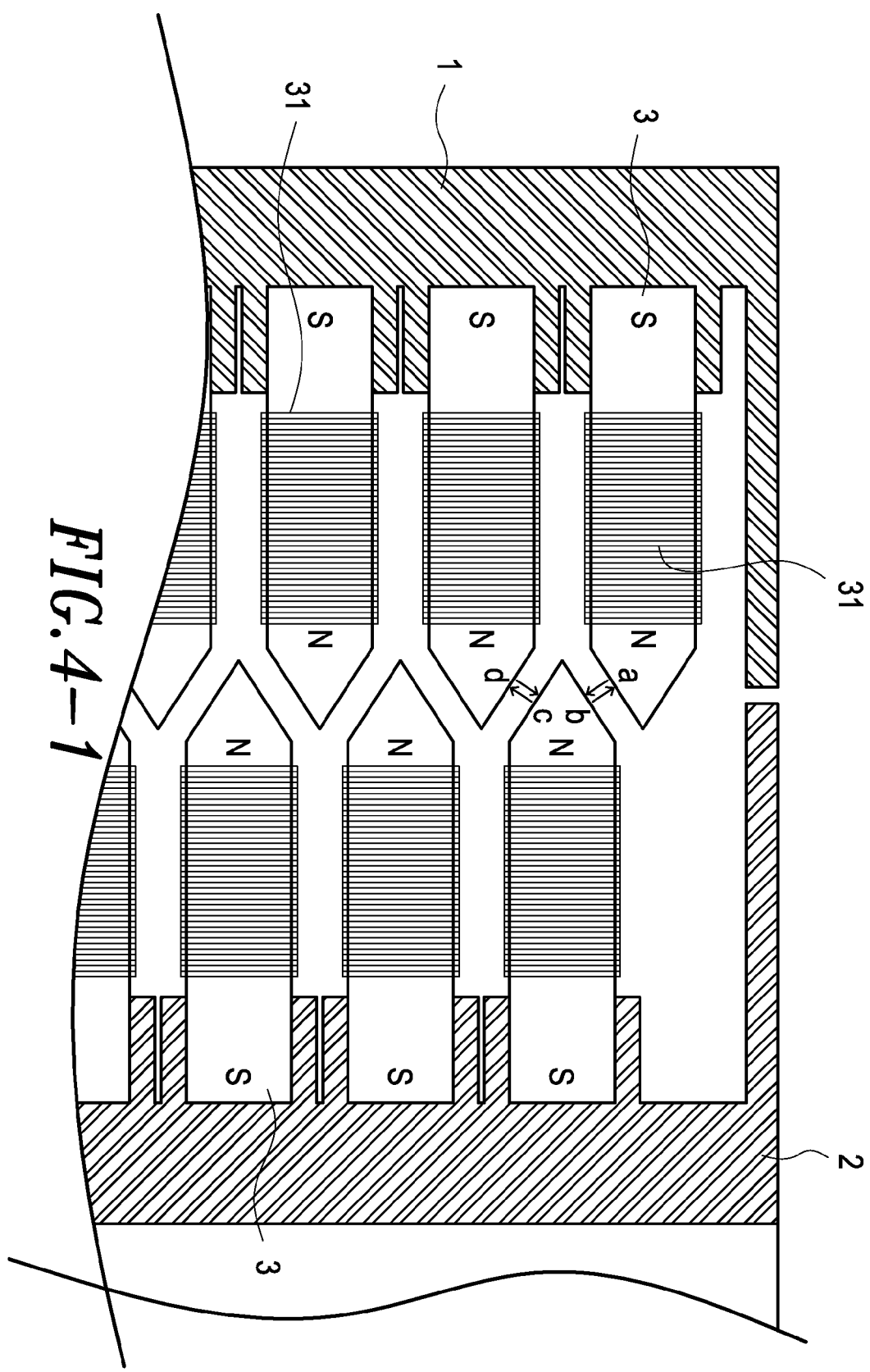

MAGNETIC REPULSION TYPE BEARING

BACKGROUND OF THE INVENTION

1. Field of the Invention

The present invention relates to a magnetic repulsion type bearing.

2. Description of the Prior Art

Various bearings are in practical use presently, and there may exceed more than 10,000 kinds of bearings if being classified in detail according to the usage and specialty. As long as the function and the way of motion are considered, the bearings can be classified as a roller bearing and a sliding bearing whereas both have their merits and demerits.

If the two are compared with each other, the roller bearing is advantageous for its lower friction, easier to lubricate, capability for supporting both radial and thrust force, fairly better overload capability and well adaptable to the rotating shaft thereby requiring less starting torque, saving less lengthwise space only if the shaft diameter is proper. On the other hand, the roller bearing is disadvantageous for its high price, large operating noise, requiring larger radial space, short lifespan, less ability to withstand vibration without precaution of break down which way be aggravated to destruction of the entire mechanism.

In the meanwhile, the sliding bearing is suitable for a heavy load, low operation speed and impacting machine, whereas the roller bearing is essentially applicable to light load, high operation speed, high precision and non-impacting machine. However, both kinds of bearings have their limits. For instance, friction problem is inevitable to both, and friction not only brings about energy loss and high temperature to deform the machine. As a result, the precision of the products is degraded, even damaging the equipment. The higher the speed, the severer the problem will be. For solving the friction problem, an appropriate lubricant is used to decrease the friction resistance, but the lubricant is easy to contaminate the surroundings or even affect the operation of the bearing.

In all, the traditional surface contact type bearing is unable to get rid of frictional force at all, the mutual frictional contact among the component parts in the machine produces powdered particles from the contact surface which pervading in the air to cause the ambient condition unqualified for high technological industry. For thoroughly solving the friction, the gist of the development is directed to the non-contact type bearing.

The non-contact type bearings which are on the present market can be essentially classified in following three categories:

1. Air bearing: It has the demerits that the working precision degrades as the load increases uncontrollably. Besides, poor rigidity causes it unable to withstand lager load.

2. Fluid bearing: It has the merits of high rigidity to carry larger load with low cost, but the high fluid damping and liable to be affected by temperature degrade its working precision.

3. Magnetic repulsion (suspension) bearing: It is considered to be the most hopeful non-contact type bearing. The working principle is based on the magnetic force. The magnetic suspension force induced by the magnetic field suspends the rotating shaft and prevents contact between the stator and rotor.

As compared with other non-contact type bearings, the magnetic repulsion (suspension) bearing has several noteworthy advantages, namely:

1. No rotational damping force, rotational speed of the shaft is higher than that which uses other bearings.

2. No complicate lubrication or pneumatic means is needed.

3. A long lifespan contributes to lowering maintenance cost.

4. No frictional resistance and noise contributes to maintaining silent and clean environment.

5. Applicable to operate in very low temperature or high vacuum ambient condition such as in the outer space.

6. Assured mechanical rigidity contributes to effectively eliminating vibration in operation.

Although the magnetic suspension bearing has many advantages as described above, it still has several inherent shortcomings, namely:

1. The resistance of the field windings on the electromagnet generates heat when carrying the exciting current results in an energy loss.

2. Low magnetic induction.

3. Severe ineffective divergence of the magnetic flux.

4. Complicated mechanical structure causing difficulty in assembling.

For these defects noticeable on the magnetic repulsion (suspension) type bearing, an improvement is seriously required.

SUMMARY OF THE INVENTION

It is a main object of the present invention to provide a magnetic repulsion type bearing in which a plurality of pentagonal electromagnets (induction iron) are provided for a rotor and a stator to be arranged alternately so as to keep the magnetic force of the electromagnets balancing with each other thereby being held in the stable position without random excursion.

It is another object of the present invention to configurate the electromagnet in a single pentagonal block so as to prevent random diverging of the magnetic flux and upgrade the structural rigidity of the bearing by appropriately controlling the distribution of the magnetic flux.

It is one more object of the present invention that a current controlling device is provided to control amount of current and the direction of the current flow so as to control the strength of the electromagnetic force and the polarity thereby unifying the force exerting around the rotor to improve magnetic inductance. By adjusting the magnetic repulsion type bearing to an optimum position, the excursion of the rotor out of its ideal route can be avoided.

It is still another object of the present invention to ensure the stator and the rotor never clash with each other to lose the kinetic energy through operation of the magnetic repulsion type bearing so as to facilitate the rotational shaft to operate in a high speed.

In keeping with an aspect of the invention, these and other objects of the invention are accomplished by providing a plurality of single pentagonally shaped electromagnets (induction iron pieces) each provided with a field winding; a stator enclosing the plurality of electromagnets the stator made of a permeable material, is formed into a hollow annular shape; a rotor enclosed by the plurality of electromagnets, the rotor made of a permeable material, is formed into a hollow annular shape; an outer casing enclosing the stator, the outer casing is made of a permeable material for isolating the magnetism; an inner casing installed inside the rotor is made of a permeable material for isolating the magnetism; and a current controlling device for controlling the amount of the current and the direction of the current so as to control the strength of the electromagnetic force and the polarity.

The rotor and the stator are coupled together, and the single pentagoncally shaped electromagnets of the rotor and the stator are arranged in an alternate manner to generate an electric repulsion force which induces a rotational magnetic field thereby balancing the magnetism between the electromagnets of the rotor and the stator. As a result, the electromagnets are stably fixed at the proper position without excursion.

When the stator and the rotor move with each other, a gap is formed between the stator and rotor when they cross each other respectively at the top and the bottom thereof which being smaller than one appropriately formed between crossing electromagnets of the stator and the rotor. If the rotor operates under an overload, the stator and the rotor will clash each other at their top and bottom so as to prevent the collision of the corresponding electromagnets of the stator and the rotor, and further, the magnetism of the electromagnets are isolated with each other by enclosing the permeable stator and the permeable rotor with the outer casing and the inner casing.

As the single pentagonal electromagnets are one by one arranged one by one in parallel and vertical, the divergence of the magnetic flux can be effectively eliminated that contributes to proper distribution of the magnetic flux and upgrading the structural rigidity. The super conductive wires used for the field winding result in nearly zero resistance which contributes to greatly increasing the current carrying capacity of the field winding.

In all, the present invention has several noteworthy merits, namely:

1. A plurality of single pentagonal electromagnets alternately arranged in the stator and the rotor balance the magnetic force therebetween which in turn contribute to fix the electromagnet stably at its proper position without excursion during operation.

2. The proper gap can be obtained with an electric repulsion force between the electromagnets of the stator and the rotor alternately arranged up and down. The gap formed between the top and the bottom of crossing stator and rotor is smaller than one appropriately formed between crossing electromagnets of the stator and the rotor. If the rotor is overloaded, the stator and the rotor will clash each other at their top and bottom so as to prevent the collision of the corresponding electromagnets of the stator and the rotor.

3. The single pentagonal electromagnets are arranged one by one in parallel and vertical on the stator and the rotor, the strongest magnetic force exists on the tips of the corresponding electromagnets of the stator and the rotor so that the rigidity is enhanced by improving the magnetic flux distribution.

4. The current controlling device controls the amount and direction of the current so as to control the strength of the electromagnetic force and the polarity thereby exerting a uniform force around the surrounding of the rotor and increasing the magnetic inductance, and the bearing is adjusted to a most appropriate position to prevent excursion of the rotor from its optimum route.

5. The electric repulsion force is employed to sustain the rotor such that the rotor is able to rotate with rapid response but without friction and noise that leads to operable with a very high speed.

BRIEF DESCRIPTION OF THE DRAWINGS

FIG. 1 is an exploded view of the present invention.
FIG. 2 is an enlarged exploded view of the stator and rotor of the present invention.
FIG. 3 is an assembly view of the stator and the rotor of the present invention.
FIG. 4 is a cross sectional view of the stator and the rotor of the present invention.
FIG. 4-1 is an exemplary view showing the distribution of the magnetic force of the stator and the rotor according to the present invention.

DETAILED DESCRIPTION OF THE PREFERRED EMBODIMENT

Figure 5:
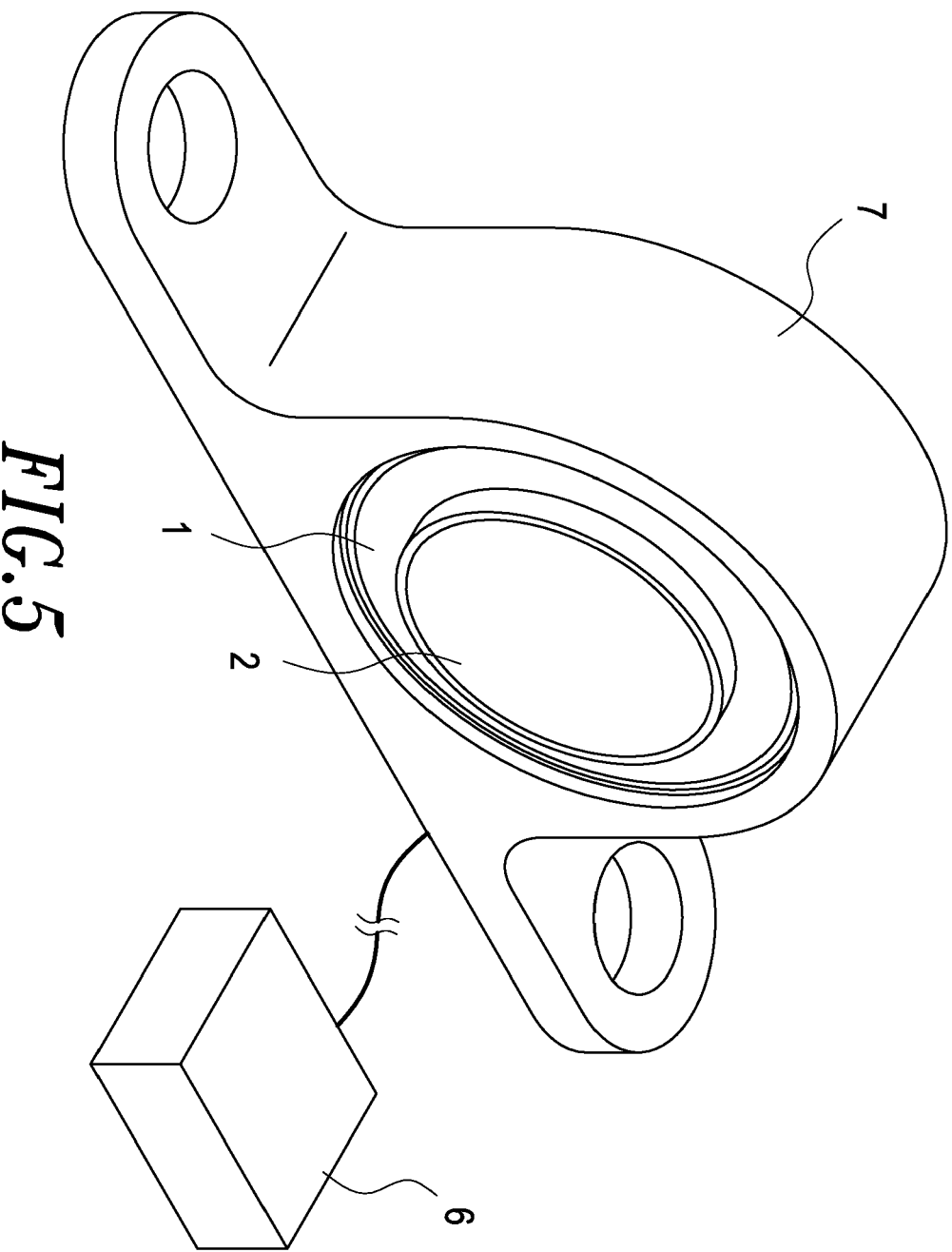
FIG. 5 is a perspective view of the present invention.

Referring to all the drawings from FIG. 1 through FIG. 5, the magnetic repulsion type bearing according to the present invention essentially comprises the following component parts:

a plurality of single pentagonal shaped electromagnets 3 each provided with a field winding 31;

a stator 1 enclosing the plurality of electromagnets 3, wherein the stator 1 made of permeable material is formed into a hollow annular shape by arranging the electromagnets on top of each other a rotor 2 enclosed by the plurality of electromagnets 3, wherein the rotor 2 made of permeable material is formed into a hollow annular shape by arranging the electromagnets 3 on top of each other;

an outer casing 4 made of permeable material enclosing the stator 1 so as to isolate the magnetism;

an inner casing 5 made of a permeable material installed on the inner wall surface of the rotor 2 so as to isolate the magnetism; and a current controlling device 6 for controlling the amount of the current and direction of the current generated by the electromagnets 3 so as to control the strength of the electromagnetic force and the polarity.

The rotor 2 is set in the cavity of the stator 1 to form a coupled structure. The single pentagonally shaped electromagnets 3 of the stator 1 and rotor 2 are alternately arrange to produce a rotating magnetic field by electric repulsion principle thereby balancing the magnetic force of the electromagnets 3 on the stator 1 and the rotor 2 and forming a proper gap therebetween. By so the electromagnets 3 can be stably held in the position without excursion. When the stator 1 and the rotor 2 come to cross each other, a gap will be formed between the top portion of the rotor 2 and the bottom portion of the stator 1. The gap is smaller than one that is formed between two electromagnets 3. In case the rotor 2 is overloaded, the stator 1 and the rotor 2 clash with each other on the respective top and bottom portions so as to prevent mutual collision of the nearby electromagnets 3.

The single pentagonally shape electromagnets 3 are arranged one by one horizontally and vertically so as to palliate divergence of the magnetic flux and improve its distribution thereby upgrading the rigidity of the electromagnets 3. The outer casing 4 and the inner casing 5 both made of a permeable material are respectively used to enclose the stator 1 and be installed on the inner wall surface of the rotor 2 to isolate the magnetism.

Referring to FIG. 4-1, the preferable angle made between the adjacent electromagnets 3 on the stator 1 and the rotor 2 is 45°, or may be 30° and etc. The surfaces a and b repulse each other, and the surfaces c and d also repulse each other so that the electromagnets 3 of the stator 1 and the rotor 2 are exactly held at the middle position of the intercoursing without excursion when the rotor 2 rotates, The conductor of the field winding 31 on the electromagnet 3 may use the super conducting material to acquire a zero resistance state thereby greatly increasing current carrying capacity.

In operating the magnetic repulsion type bearing of the present invention, the current controlling device 6 is employed to generate DC or AC and conduct the current with the field winding 31 so as to control the strength of the magnetomotive force and the polarity of the electromagnet 3 and cause the rotor 2 to rotate. The whole structure of the present invention is fixedly supported by a yoke 7.

When the position where the electromagnet 3 of the stator 1 is put into shows S polarity, the corresponding electromagnet 3 of the rotor 2 must also be S polarity, the position thereof is enclosed with a permeable material to isolate the magnetism.

A gap is formed by repulsion at the position where the stator 1 and the rotor 2 cross with each other both show N polarity. The rotating shaft coupled with the magnetic repulsion type bearing of the present invention is allowed to rotate without friction and noise and consume less energy. The polarity of the electromagnet 3 can be changed by operation of the current controlling device 6. The strongest intensity of the magnetic force occurs on the tip position where the electromagnets 3 of the stator 1 and the rotor 2 crossing with each other.

While the invention has been described by way of examples and in terms of several embodiments, it should be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic repulsion type bearing comprising:
   a plurality of single pentagonally shaped electromagnets each provided with a field winding;
   a stator enclosing said plurality of single pentagonally shaped electromagnets, wherein said stator is made of permeable material;
   a rotor enclosed by said plurality of single pentagonally shaped electromagnets, wherein said rotor is made of permeable material;
   an outer casing enclosing said stator, wherein said outer casing is made of permeable material for isolating magnetism;
   an inner casing installed on an inner surface of said rotor, wherein said inner casing is made of permeable material for isolating the magnetism; and
   a current controlling device for controlling an amount of current and a direction of the current of said plurality of single pentagonally shaped electromagnets; so as to control a strength of a electromagnetic force and polarity;
   wherein said rotor and said stator are coupled together and said single pentagonally shaped electromagnets and said stator are arranged in an alternate manner to generate an electric repulsion force which induces a rotational magnetic field thereby balancing the magnetism between the plurality of single pentagonally shaped electromagnets and said stator, as a result, said plurality of single pentagonally shaped electromagnets are stably fixed at the proper position without excursion.

2. The bearing of claim 1, wherein a conductor of said field windings on said plurality of single pentagonally shaped electromagnets is formed of super conducting material.

3. The bearing of claim 1, wherein said stator is configurated into a hollow annular shape.

4. The bearing of claim 1, wherein said rotor is configurated into a hollow annular shape.

5. The bearing of claim 1, wherein said current controlling device is able to supply direct current (DC).

6. The bearing of claim 1, wherein said current controlling device is able to supply alternating current (AC).

\* \* \* \* \*